(12) United States Patent
Edelmann

(10) Patent No.: US 6,564,931 B1
(45) Date of Patent: May 20, 2003

(54) BELT CONVEYOR

(76) Inventor: Klaus Edelmann, Roxheimer Strasse 8, D-67547 Worms (DE)

( * ) Notice: Subject to any disclaimer, the term of this patent is extended or adjusted under 35 U.S.C. 154(b) by 0 days.

(21) Appl. No.: 09/856,715

(22) PCT Filed: Jan. 26, 1999

(86) PCT No.: PCT/DE99/00183

§ 371 (c)(1),
(2), (4) Date: May 25, 2001

(87) PCT Pub. No.: WO00/30959

PCT Pub. Date: Jun. 2, 2000

(30) Foreign Application Priority Data

Nov. 25, 1998 (DE) .......................................... 198 54 327

(51) Int. Cl.$^7$ .............................................. B65G 15/02
(52) U.S. Cl. ....................................... 198/831; 198/834
(58) Field of Search .................................. 198/831, 834

(56) References Cited

U.S. PATENT DOCUMENTS

| | | | | |
|---|---|---|---|---|
| 1,254,941 A | * | 1/1918 | Snow | 198/831 |
| 4,179,026 A | * | 12/1979 | De Vries | 198/831 |
| 5,394,977 A | * | 3/1995 | Cline | 198/831 |
| 5,456,349 A | | 10/1995 | Axmann | 198/831 |

FOREIGN PATENT DOCUMENTS

| | | |
|---|---|---|
| DE | 23 43 249 | 3/1975 |
| DE | 37 44 278 | 7/1989 |
| DE | 42 44 170 | 10/1995 |
| EP | 0 138 745 | 4/1985 |
| EP | 0 349 830 | 1/1990 |
| EP | 0 518 748 | 12/1992 |
| GB | 2 053 830 | 2/1981 |

* cited by examiner

*Primary Examiner*—Joseph E. Valenza
(74) *Attorney, Agent, or Firm*—Foley & Lardner

(57) ABSTRACT

The invention relates to a belt conveyor comprising a revolving conveyor belt (1, 1'), carrying rollers (2, 2') which are positioned between the upper strand (3) and the lower strand (4, 4') of the conveyor belt (1), a drive device and a power-transmitting unit (5, 5') for moving the conveyor belt (1). Damage to the surface of the conveyor belt of the belt conveyor by the power transmitting device is largely excluded by the fact that for power transmission a pair of elements (6, 6', 7) is provided for which cooperate in a positive-fit and in that the one element (6, 6') is assigned to the power-transmitting device (5, 5') and the other element (7) to the conveyor belt (1).

17 Claims, 3 Drawing Sheets

BELT CONVEYOR

FIELD OF THE INVENTION

The present invention relates to a belt conveyor having a circulating conveying belt, having carrying rollers, which are arranged between the top strand and the bottom strand of the conveying belt, and having a drive device and a force-transmission device for moving the conveying belt.

BACKGROUND OF THE INVENTION

It is known from practice for force to be transmitted from the drive device to the conveying belt of a belt conveyor via friction fitting. The friction between a driven carrying roller and the conveying belt, for example, may even be sufficient for this purpose. The rest of the carrying rollers are mounted in a movable manner and rotate along.

DE 42 44 170 C2 discloses a belt conveyor having an endless conveying belt, the latter being driven by means of a force-transmission device which is present in the form of a friction wheel. A drive shaft extends beneath the bottom strand of the conveying belt. On the inner radius of the belt curve, a motor is connected as a drive device to the drive shaft and, in the region of the outer radius, a friction wheel is seated on the drive shaft and is in contact with the outer surface of the conveying belt. In this case, the friction wheel interacts with a carrying roller functioning as counterpressure roller. The drive shaft is mounted such that it can be moved at an angle both in the region of the outer radius and in the region of the inner radius of the belt curve. The movable-angle mounting of the drive shaft allows adaptation of the extent to which the friction wheel is pressed against the conveying belt in proportion to the actual load. In this way, the wear is reduced if, in part-load operation, the conveying belt is only subjected to the contact-pressure force which is necessary for this purpose.

Although the belt conveyor known from DE 42 44 170 C2 reduces the wear of the conveying belt, it cannot rule it out altogether. The task of conveying foodstuffs or other goods which are to be kept clean involves, in addition to the mechanical damage to the conveying belt, the aspect of hygiene and of keeping goods clean. The abraded surface particles of the conveying belt could have a considerable adverse effect on the quality of the goods which are to be conveyed. Moreover, the known belt conveyor requires an extremely high level of structural outlay as far as the movable mounting of the separate drive shaft is concerned.

SUMMARY OF THE INVENTION

Taking as departure point the belt conveyor known from DE 42 44 170 C2, the object of the invention is to specify a belt conveyor of the type in question which largely rules out any adverse effect to the surface of the conveying belt of the belt conveyor by the force-transmission device. According to a particularly preferred configuration, the belt conveyor is intended to require just a low level of structural outlay.

The above object is achieved by the features of Patent claim 1. According to the latter, a belt conveyor of the type in question is configured such that a pair of elements which interact with one another with a form fit is provided for force-transmission purposes, and that one element is assigned to the force-transmission device and the other element is assigned to the conveying belt.

According to the invention, it has been found that the surface of the conveying belt is not adversely affected as a result of the action of the force-transmission device if a separate pair of elements is provided in order to realize force transmission. It has also been found that the use of a pair of movement-converting elements which are known per se and interact with one another with a form fit largely eliminates the disadvantages which are known in the case of friction-fitting movement conversion, in particular wear and abrasion.

According to a preferred exemplary embodiment of the belt conveyor according to the invention, the pair of elements could be present as toothed ring and toothed belt, the tooth flanks of the toothed ring and of the toothed belt interacting with one another. It would be possible for the toothed ring to be assigned to the force-transmission device and for the toothed belt to be assigned to the conveying belt.

As far as a particularly low level of structural outlay is concerned, a preferred configuration of the abovementioned exemplary embodiment provides that the toothed ring is assigned to a carrying roller, and the latter thus simultaneously assumes the role of the force-transmission device. Via a journal projecting from the carrying roller, the drive takes place by means of a motor. The toothed ring could be plugged onto the carrying roller and fixed releasably—for example via a shaft/hub connection or a feather key—to the same. In the case of a plugged-on toothed ring, it is advantageous that it is possible to use carrying rollers which are already present. It is particularly advantageous for each carrying roller to be assigned at least one toothed ring. Over the entire running path of the conveying belt, it would then be the case that the toothed belt and the toothed rings interengage and move the conveying belt in a dimensionally stable manner. Corresponding to the toothed ring or rings which is/are arranged between the top and bottom strands and belongs/belong to the preferred configuration mentioned above, the toothed belt is arranged on the underside of the conveying belt, and extends in the running direction of the same. Arranging the toothed belt on the underside of the conveying belt once again ensures that the top side of the conveying belt, which is charged if appropriate with goods which are to be kept clean, is not subject to any force transmission, mechanical damage or production of abrasion particles or other contaminants.

An expedient development of the preferred configuration of the belt conveyor according to the invention makes provision for the toothed ring to be arranged at the end of the carrying roller. As a result, on the one hand, straightforward maintenance of the force-transmission device is made possible and, on the other hand, this arrangement is also more cost-effective than a, for example, central arrangement. Direct force transmission over a short distance is achieved by a journal for the connection of the drive device projecting from that end of the carrying roller which is provided with the toothed ring.

It is particularly advantageous if the toothed belt extends in the region of the side border of the conveying belt. As a result, on the one hand, straightforward production of the conveying belt with the toothed belt is made possible by the direct relationship to the border region and, on the other hand, a role is also played here by the accessibility to the pair of elements for maintenance purposes and, of course, by the coordination between the toothed belt and the arrangement of the toothed ring.

In addition to toothed belts and toothed rings with normal toothing, it would also be possible to realize multisplining. This further reduces undesired sliding and thus wear, heating and noise development. In order to absorb high tensile forces, it would be possible for Kevlar filaments to be incorporated in the toothed belt, which usually consists of plastic. It would be possible for the conveying belt to be produced with the toothed belt by welding, vulcanizing or adhesive bonding.

According to a particularly preferred configuration, it would be possible for the toothed belt to be a constituent part of a toothed-belt component which is of essentially U-shaped design in the transverse direction of the toothed belt. The U-shape makes it possible for the toothed-belt component simply to be plugged onto the border of the conveying belt until the border region has come into contact with the base part between the U-legs. The inner surface of the toothed-belt component may have been provided with adhesive beforehand. As a result of its shaping and of being produced in this way, the toothed-belt component engages around the side-border region of the conveying belt.

While the toothed belt of the conveying belt is subjected to compressive force by the toothed ring, and this largely rules out detachment of the toothed-belt component on the underside of the conveying belt, a counterpressure device could be provided in order to secure that region of the toothed-belt component which extends on the top side of the conveying belt. In design terms, the counterpressure device could be present in the form of an arm which acts on the U-leg of the toothed-belt component on the top side and thus constantly presses the same onto the top side of the conveying belt.

As far as reliable guidance is concerned, it would be possible for the toothed belt or the toothed-belt component containing the toothed belt to form a bead. A bead ridge is thus produced over the length of the conveying belt. In the case of a U-shaped toothed-belt component, the bead ridge extends in each case at the free ends of the U-legs, at a distance from the border of the conveying belt, the distance depending essentially on the width of the toothed belt. As an alternative to a bead ridge, it would be possible for the toothed-belt component or for the straightforward toothed belt also to have at least one beveled free end. The guidance measure taken on the toothed belt or on the specific toothed-belt component is provided in order that a guide roller or a pair of guide rollers acts on the beveled surface or on the bead or bead ridge. The guidance measure explained above could be taken equally well in the case of belt curves and straight belt lines and of belt S-shapes bridging different heights.

In the case of belt curves, the force acting on the conveying belt is directed toward the inner radius of the belt curve, with the result that the guide rollers, in an advantageous manner which is known per se, could have inclined running surfaces. Correspondingly angled retaining arms as a constituent part of retaining structures for the guide rollers could be arranged in each case in the region of a carrying roller. The guide rollers could be arranged in pairs on the top strand and on the bottom strand of the conveying belt.

It should be emphasized at this point that, with the abovementioned configuration of the belt conveyor according to the invention having the bead or beveled free ends, two functions are combined in the pair of form-fitting elements. Not only the force transmission, but also the guidance of the conveying belt, takes place. The dimensional stability of the conveying belt is advantageously increased by the pair of form-fitting elements with the specific configuration of the toothed belt or of the toothed-belt component for action of the guide rollers thereon.

In the case of the already cited design of the belt conveyor in the form of a belt curve, the carrying rollers are of conical design and the toothed ring is arranged at the larger-diameter end of the respective carrying roller, that is to say on the outer radius of the belt curve. The drive device is present as a motor and is assigned to the first carrying roller of the belt curve. The form-fitting interengagement of the toothed wheel and toothed belt takes place in the region of each carrying roller, the form fit, in relation to the first, motor-driven carrying roller, serving for force-transmission purposes and, in relation to the rest of the rollers, serving for guiding the conveying belt.

The previously explained principle of force transmission via a pair of elements which interact with one another with a form fit could also be used in the case of a straight belt line or in the case of a height-changing belt S-shape. Here, the carrying rollers are of a cylindrical design and the force transmission takes place—as with the belt curve—at a first carrying roller, while the following carrying rollers, likewise equipped with the pair of form-fitting elements, serve for guiding the conveying belt. In contrast to the belt curve, however, it would be possible, in the case of the straight belt line or in the case of the belt S-shape, for the pair of elements to be arranged at the two free ends of the respective carrying roller and on the two border regions of the conveying belt. It would thus be possible specifically for the two border regions of the conveying belt to have a toothed belt or a toothed-belt component which interacts with the toothed rings at the two free ends of each carrying roller. Furthermore, it would also be possible, with these types of construction of the belt conveyor according to the invention, to provide guide rollers.

A further advantage of the preferred embodiment of the belt conveyor according to the invention, the toothed ring and toothed belt interacting, consists in the improved capacity for controlling the belt speed in accordance with the current loading. It would be possible to provide a control device which senses a change in the speed by corresponding measuring sensors and adjusts the power of the drive device in line with the safety regulations.

In comparison with the force transmission realized by friction fitting, the belt conveyor according to the invention not only has the advantage of better capacity for control, but also has the advantage that the conveying belt has a high level of dimensional stability as a result of the guidance by means of the pair of form-fitting elements and by means of the pairs of guide rollers and can be subjected to higher torques. Overall, it is possible to achieve an increased level of drive power during start-up. In the case of the belt conveyor according to the invention being designed in the form of a belt curve with an inner radius of 400 mm, the carrying rollers rotate at 230 rpm at a maximum speed of 1.5 m/sec.

There are various possibilities then, of advantageously configuring and developing the teaching of the present invention. For this purpose, reference is made, on the one hand, to the claims subordinate to Patent claim 1 and, on the other hand, to the following explanation of an exemplary embodiment of the invention with reference to the drawing. In conjunction with the explanation of the cited exemplary embodiment of the invention, generally preferred configurations and developments of the teaching are also explained. In the drawing:

BRIEF DESCRIPTION OF THE DRAWINGS

FIG. 1 shows a preferred exemplary embodiment of the belt conveyor according to the invention. The belt conveyor has a conveying belt 1 which circulates around deflecting rollers (not illustrated here). As is indicated in FIG. 4, a plurality of carrying rollers 2 or 2' are provided. According to FIG. 1, the carrying rollers 2 are arranged between the top strand 3 and the bottom strand 4 of the conveying belt 1. Also provided are a drive device (not illustrated here) in the form of a motor and a force-transmission device 5 for moving the conveying belt 1.

Figure 1:
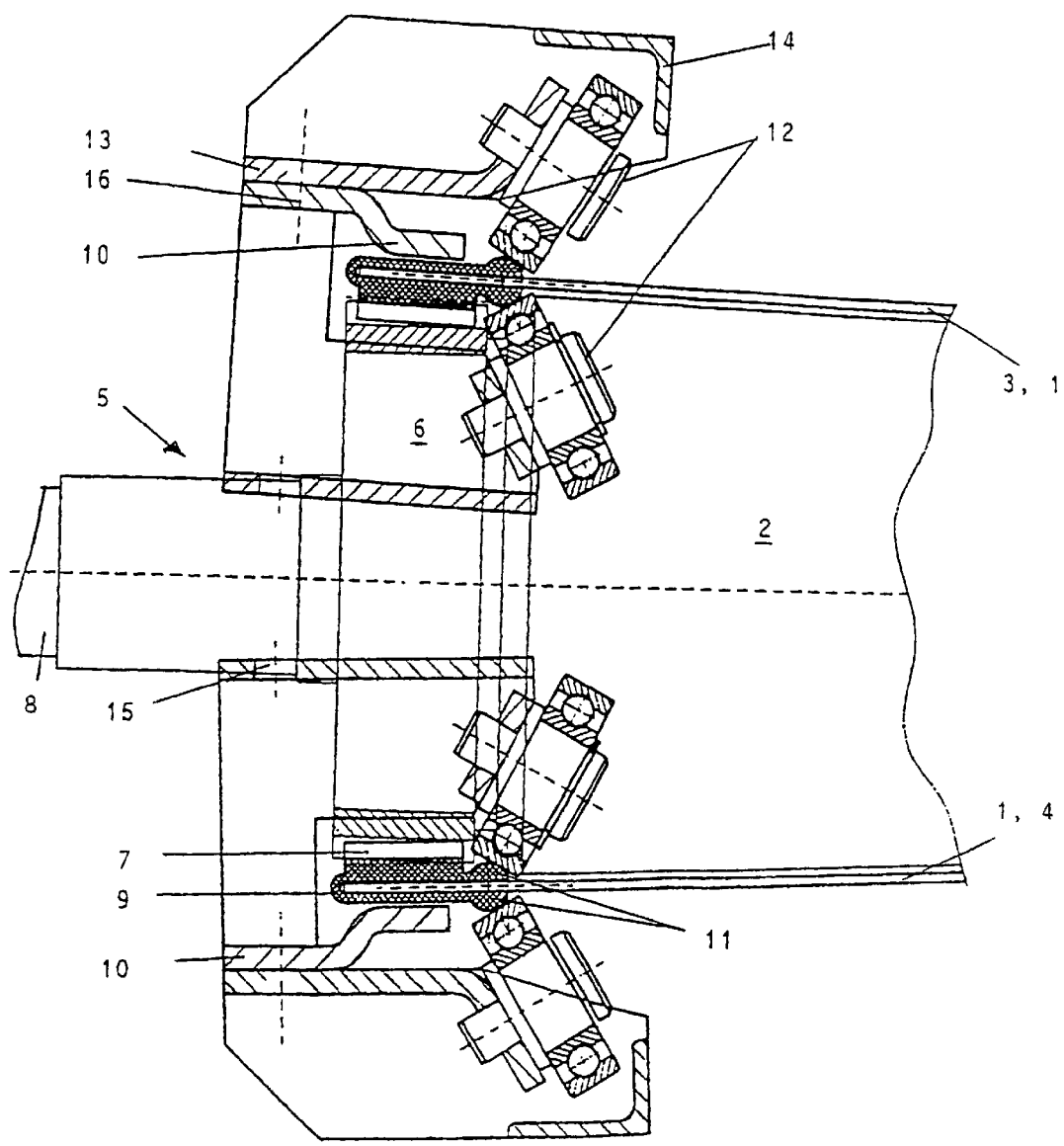
FIG. 1 shows a cross-sectional illustration of an exemplary embodiment of the belt conveyor according to the invention relating to the transmission of force to the conveying belt and to the guidance of the latter.

Provided according to the invention for force-transmission purposes is a pair of elements 6, 7 which interact with one another with a form fit, in this case one element 6, in the form of a toothed ring 6, being assigned to the force-transmission device 5 and the other element 7, in the form of a toothed belt 7, being assigned to the conveying belt 1.

DETAILED DESCRIPTION OF PREFERRED EMBODIMENTS

Figure 2:
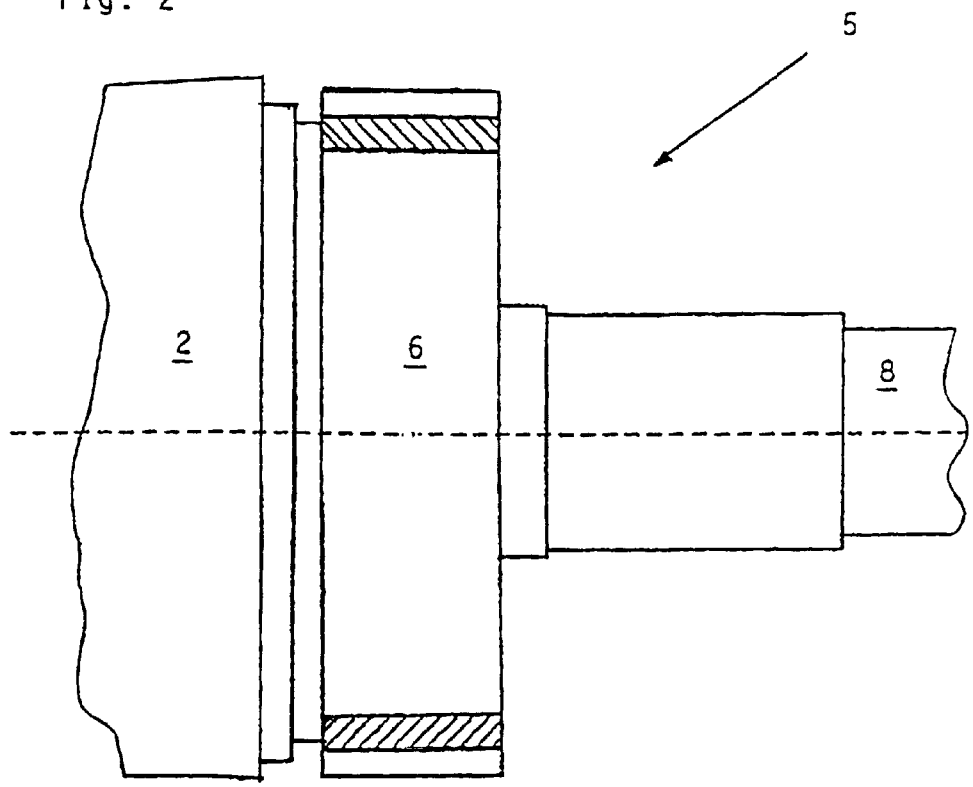
FIG. 2 shows, on an enlarged scale, a schematic illustration of a cross-sectional profile of the toothed ring from FIG. 1 fastened on the carrying roller.

The toothed ring 6 shown in FIG. 2 is assigned to each carrying roller 2. In the exemplary embodiment with conical carrying rollers 2 which is shown here, in each case one toothed ring 6 is arranged at the larger-diameter end of the respective carrying roller 2. The carrying roller 2 shown in FIG. 2, as single carrying roller 2, has a journal 8 which can be connected to the drive device.

Figure 3:
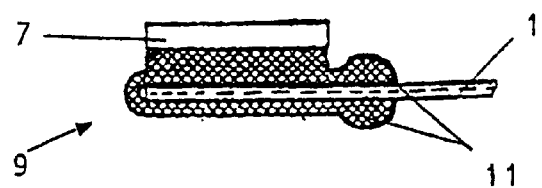
FIG. 3 shows a schematic illustration of a cross-sectional profile of the toothed-belt component from FIG. 1 engaging around the conveying belt.

The toothed belt 7 illustrated in FIG. 3 is fixed on the conveying belt 1. The teeth (not referred to in any more detail) of the toothed ring 6 and the toothed belt 7 may be, for example, of the standard size 8M.

Figure 4:
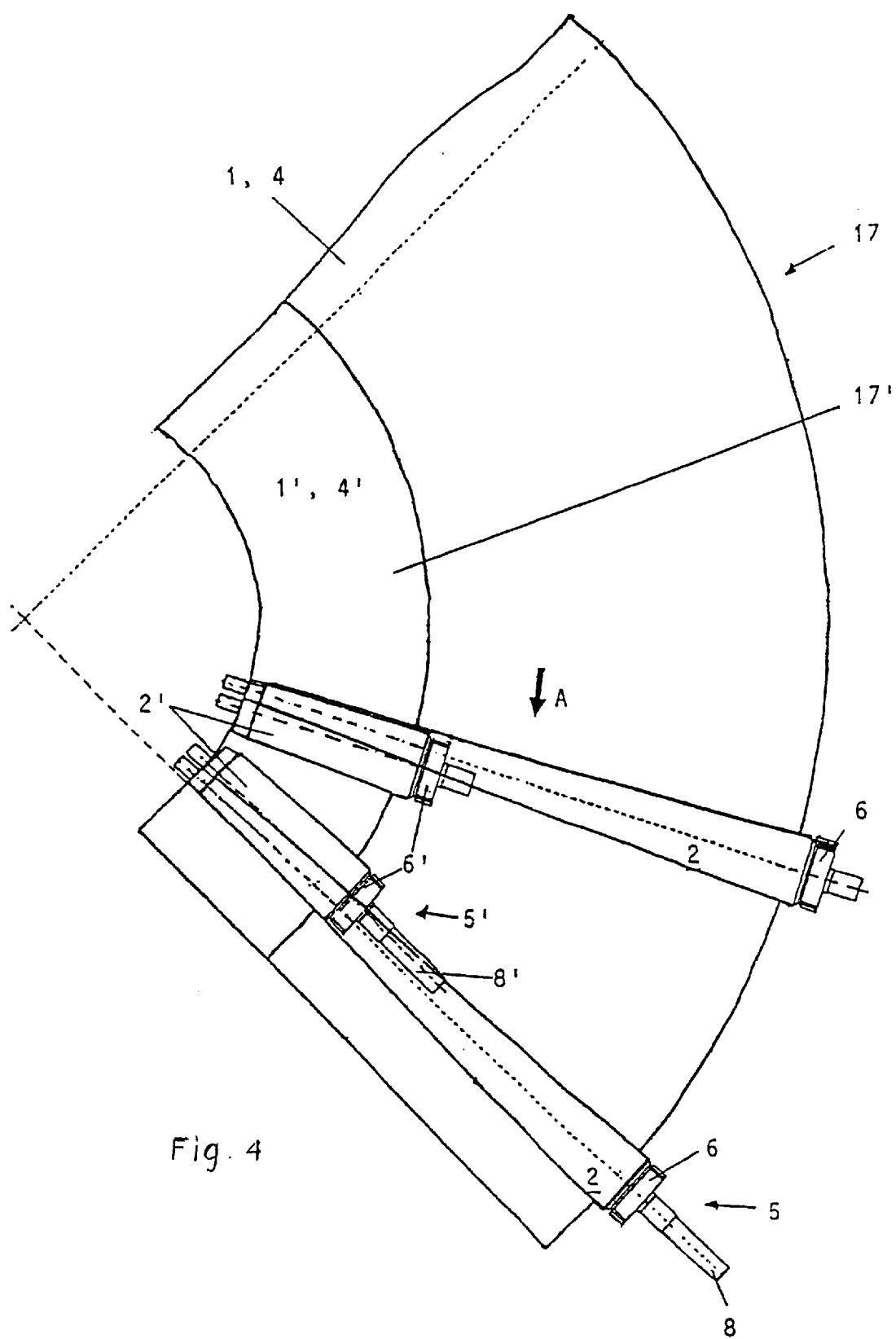
FIG. 4 shows, in simplified form, a schematic illustration of part of a plan view of a belt curve which is indicated, the top strand of the conveying belt being omitted and two different carrying-roller variants being shown, one carrying-roller variant corresponding to that from FIG. 1.

It can be gathered from FIG. 1 that the toothed belt 7 is arranged on the underside and on the side border of the conveying belt 1, in the running direction indicated by an arrow A in FIG. 4, and, in the same way as the toothed ring 6, has normal toothing.

The specific configuration of the toothed belt 7 according to the exemplary embodiment explained here consists in that this belt is a constituent part of a toothed-belt component 9, which is shown in FIGS. 1 and 3, is of essentially U-shaped design in the transverse direction of the toothed belt 7 and engages around the side-border region of the conveying belt 1. That region of the toothed-belt component 9 which extends on the top side of the conveying belt 1 is pressed onto the conveying belt 1 by means of a counterpressure device 10 acting on the top strand 3 and bottom strand 4. The free ends of the essentially U-shaped toothed-belt component 9 are designed as a bead 11, which produces a bead ridge along the conveying-belt border. Acting on the bead 11 are guide rollers 12, which are arranged in pairs on the top strand 3 and bottom strand 4 and are assigned to the larger-diameter end of each of the conical carrying rollers 2.

The guide rollers 12 are fastened on angled retaining arms 13 of a retaining structure 14 such that they act on the toothed-belt component 9 and/or on the bead 11 by way of inclined running surfaces. 15 designates bores of the retaining structure 14 which serve for external fastening on the belt table. The counterpressure device 10 is positioned and secured by a connection to the retaining arm 13, this connection being indicated by the dashed drill line designated 16.

FIG. 4 shows two different types of construction of the carrying rollers 2, 2', the two differing in terms of the overall length and the diameter. It can be seen particularly clearly that the carrying rollers 2, 2' are conical and form a beltcurve 17, 17'. In the plan view, the top strand of the respective conveying belt 1, 1' has been omitted and only the view of the respective bottom strand 4, 4' is illustrated.

FIG. 4 also shows that in each case only the first carrying roller 2, 2' is provided with a journal 8, 8' for the drive device, and the force transmission and movement conversion take place there via the toothed ring 6, 6' and the respective toothed belt (not illustrated there). Every other carrying roller 2, 2' is likewise provided with a toothed ring 6, 6', which then performs a guidance function.

As far as other features not shown in the figures are concerned, you are referred to the general part of the description.

To conclude, it should be pointed out that the teaching according to the invention is not restricted to the exemplary embodiment discussed above. Rather, other pairs of elements which interact with one another with a form fit, other types of construction of the belt conveyor with cylindrical carrying rollers and force transmission on both sides, and a wide range of different control and drive concepts are possible.

List of Designations 1, 1' Conveying belt
2, 2' Carrying rollers
Top strand of 1
4, 4' Bottom strand of 1
5, 5' Force-transmission device
6, 6' Element, toothed ring
7 Element, toothed belt
8, 8' Journal of 2, 2'
9 Toothed-belt component
10 Counterpressure device
11 Bead of 9
12 Guide rollers
13 Retaining arm
14 Retaining structure
15 Bore in 14
16 Connection between 10 and 13
17, 17' belt curve
A Running direction of 1, 1'

What is claimed is:
1. Belt conveyor having a circulating conveying belt, comprising:
   carrying rollers arranged between a top strand and a bottom strand of the circulating conveying belt;
   upper and lower guide rollers acting on upper and lower beads on the circulating conveying belt and forcing the circulating conveying belt radially outward, the upper and lower beads being formed opposite to each other on the circulating conveying belt;
   at least one toothed ring interacting with at least one toothed belt arranged on the circulating conveying belt, whereby the upper bead is neighbored to the toothed belt; and
   a drive device for moving the circulating conveying belt.

2. Belt conveyor according to claim 1, wherein the toothed belt is arranged on the underside of the circulating conveying belt, in the running direction of the circulating conveying belt.

3. Belt conveyor according to claim 2, wherein the toothed ring is arranged at the end of the carrying rollers, and wherein projecting from the end of a first carrying roller is a journal for the connection of the drive device.

4. Belt conveyor according to claim 3, wherein the toothed belt extends in the region of the side border of the circulating conveying belt.

5. Belt conveyor according to claim 1, wherein the toothed belt and the toothed ring have multisplining.

6. Belt conveyor according to claim 1, wherein Kevlar filaments are incorporated in the toothed belt.

7. Belt conveyor according to claim 1, wherein the toothed belt is attached on the circulating conveying belt via one of welding, vulcanizing, and adhesively bonding thereto.

8. Belt conveyor having a circulating conveying belt, comprising:
   carrying rollers arranged between a top strand and a bottom strand of the circulating conveying belt; and
   a drive device and a force-transmission device for moving the conveying belt,
   wherein a pair of elements which interact with one another with a form fit is provided for force-transmission purposes, one of said elements being assigned to the force-transmission device and the other of said elements being assigned to the conveying belt,
   wherein the force-transmission device comprises at least one toothed ring, and wherein the circulating conveying belt has at least one toothed belt, the toothed ring and toothed belt interacting with a form fit,
   wherein the toothed belt is a constituent part of a toothed-belt component which is of essentially U-shaped design in the transverse direction of the toothed belt and engages around the side-border region of the conveying belt.

9. Belt conveyor according to claim 8, wherein the toothed ring is assigned at least to a first belt-conveyor carrying roller, which is operatively connected to the drive device.

10. Belt conveyor according to claim 8, further comprising a counterpressure device, which acts on that region of the toothed-belt component which extends on the top side of the circulating conveying belt.

11. Belt conveyor according to claim 8, wherein the free ends of the essentially U-shaped toothed-belt component are designed as a bead.

12. Belt conveyor according to claim 8, further comprising guide rollers, which act on one of the toothed belt and the toothed-belt component.

13. Belt conveyor having a circulating conveying belt, comprising:
   carrying rollers arranged between a top strand and a bottom strand of the circulating conveying belt;
   upper and lower guide rollers acting on upper and lower beads on the circulating conveying belt and forcing the circulating conveying belt radially outward, the upper and lower beads being formed opposite to each other on the circulating conveying belt;
   at least one toothed ring interacting with at least one toothed belt formed on the circulating conveying belt, whereby the upper bead is neighbored to the toothed belt; and
   a drive device for moving the circulating conveying belt,
   wherein a pair of said guide rollers are arranged on angled retaining arms such that the guide rollers act on one of the toothed belt and the upper and lower beads, by way of inclined running surfaces.

14. Belt conveyor according to claim 12, wherein in each case one pair of guide rollers on the top strand and on the bottom strand of the circulating conveying belt act on one of the toothed belt and the toothed-belt component, extending over the entire border region of the circulating conveying belt.

15. Belt conveyor according to claim 1, wherein the carrying rollers are of conical configuration and form a belt curve, and wherein the toothed ring undergoes a form-fitting connection in relation to the circulating conveying belt at the larger-diameter end of the respective carrying roller on the outer radius of the belt curve.

16. The belt driving device of claim 1, wherein one of said toothed ring and said toothed belt is releasably fixed to the carrying rollers.

17. Belt conveyor according to claim 16, wherein one of said toothed ring and said toothed belt is releasably fixed to the force-transmission device by one of a shaft/hub connection and a feather key connection.

* * * * *